(12) United States Patent
Zhang et al.

(10) Patent No.: US 12,313,118 B2
(45) Date of Patent: May 27, 2025

(54) TRANSMISSION MECHANISMS, CABLE MANAGEMENT APPARATUS, AND MEDICAL DEVICES

(71) Applicant: SHANGHAI UNITED IMAGING HEALTHCARE CO., LTD., Shanghai (CN)

(72) Inventors: Jian Zhang, Shanghai (CN); Xu Cai, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 98 days.

(21) Appl. No.: 17/935,919

(22) Filed: Sep. 27, 2022

(65) Prior Publication Data

US 2023/0100195 A1 Mar. 30, 2023

(30) Foreign Application Priority Data

Sep. 27, 2021 (CN) .......................... 202111148657.9

(51) Int. Cl.
*F16C 33/30* (2006.01)
*B25J 18/00* (2006.01)
*F16C 29/00* (2006.01)

(52) U.S. Cl.
CPC ............. *F16C 29/005* (2013.01); *B25J 18/00* (2013.01); *F16C 33/30* (2013.01)

(58) Field of Classification Search
CPC .. B25J 5/02; B25J 18/00; H02G 11/02; H02G 11/006; B65H 75/4402; B65H 75/4457; B65H 75/403; F16C 33/30; F16C 29/005

USPC ............... 74/490.01, 490.02; 242/397.1, 377
See application file for complete search history.

(56) References Cited

U.S. PATENT DOCUMENTS

| | | | |
|---|---|---|---|
| 6,612,449 B1 * | 9/2003 | Otani ..................... | B25J 13/085 212/317 |
| 9,510,991 B2 * | 12/2016 | Stockmaster .......... | A61H 3/008 |
| 10,059,011 B2 * | 8/2018 | Burlot .................. | B25J 19/0025 |
| 2006/0045672 A1 * | 3/2006 | Maynard ............. | B65G 1/0435 414/276 |
| 2007/0147714 A1 | 6/2007 | Matsumoto et al. | |
| 2007/0201776 A1 | 8/2007 | Tsai et al. | |
| 2012/0275571 A1 * | 11/2012 | Neuber ................ | A61B 6/4464 378/194 |

(Continued)

FOREIGN PATENT DOCUMENTS

| | | |
|---|---|---|
| CN | 102182760 A | 9/2011 |
| CN | 109812498 A | 5/2019 |
| CN | 111776891 A | 10/2020 |

(Continued)

*Primary Examiner* — T. Scott Fix
(74) *Attorney, Agent, or Firm* — METIS IP LLC

(57) ABSTRACT

One or more embodiments of the present disclosure are directed to a transmission mechanism. The transmission mechanism may include a guiding rail, and a slider movably disposed on the guiding rail, wherein the slider may be provided with a rolling part, the rolling part may roll with respect to the guiding rail, and limit the slider in a first direction and a second direction of the guiding rail, and the first direction and the second direction may both be perpendicular to a length direction of the guiding rail, and an angle between the first direction and the second direction may be greater than 0° and less than 180°.

20 Claims, 12 Drawing Sheets

(56) References Cited

U.S. PATENT DOCUMENTS

2015/0328780 A1* 11/2015 Burlot ................. B25J 19/0025
74/490.02
2017/0203662 A1* 7/2017 Hiebenthal ............. B60L 53/30

FOREIGN PATENT DOCUMENTS

| | | |
|---|---|---|
| CN | 212615924 U | 2/2021 |
| JP | H0215917 Y2 * | 4/1990 |
| JP | 2009162275 A | 7/2009 |
| JP | 2017187094 A | 10/2017 |
| JP | 2019138366 A | 8/2019 |
| WO | 2015194696 A1 | 12/2015 |

* cited by examiner

TRANSMISSION MECHANISMS, CABLE MANAGEMENT APPARATUS, AND MEDICAL DEVICES

CROSS-REFERENCE TO RELATED APPLICATIONS

This application claims priority to Chinese Patent Application No. 202111148657.9, filed on Sep. 27, 2021, the contents of which are incorporated herein by reference in their entirety.

TECHNICAL FIELD

The present disclosure relates to the field of transmission mechanism, in particular, to transmission mechanisms, cable management apparatus, and medical devices.

BACKGROUND

A mechanical arm drives a working mechanism arranged on an end of the mechanical arm to move when the mechanical arm is performing an operation. The working mechanism is often connected with a cable. When the mechanical arm is performing the operation, it is necessary to release, take up, or guide a direction of the cable connected with the working mechanism to prevent the cable from being disordered and hindering the movement of the mechanical arm. A cable management apparatus is provided with a wire wheel that can accommodate the cable and drive the cable to move. Therefore, the cable management apparatus also needs a transmission mechanism to drive the wire wheel to move. An existing linear transmission mechanism and an arc-shaped transmission mechanism often use a guiding rail and a slider to achieve relative movements. However, due to the limited processing accuracy of the transmission mechanisms, after a long-term use, the slider is easy to deform to be stuck on the guiding rail, thereby affecting the smoothness of sliding of the slider and reducing the working efficiency of the transmission mechanism.

SUMMARY

According to an aspect of the present disclosure, a transmission mechanism is provided. The transmission mechanism may include a guiding rail; and a slider movably disposed on the guiding rail, wherein the slider is provided with a rolling part, the rolling part rolls with respect to the guiding rail, and limits the slider in a first direction and a second direction of the guiding rail, and the first direction and the second direction are both perpendicular to a length direction of the guiding rail, and an angle between the first direction and the second direction may be greater than 0° and less than 180°.

In some embodiments, the rolling part may include a primary rolling part and a secondary rolling part, an angle between a rolling axis of the primary rolling part and a rolling axis of the secondary rolling part being greater than 0° and less than 180°; the guiding rail includes a plurality of primary contact surfaces and a plurality of secondary contact surfaces, each of the plurality of primary contact surfaces being adjacent and in contact to at least one of the plurality of secondary contact surfaces; the plurality of primary contact surfaces are perpendicular to the first direction, and the plurality of secondary contact surfaces are perpendicular to the second direction; and the plurality of primary contact surfaces are in contact with the primary rolling part, and the plurality of secondary contact surfaces are in contact with the secondary rolling part.

In some embodiments, the primary rolling part may include at least one group of primary rollers, and the secondary rolling part includes at least one group of secondary rollers; the at least one group of primary rollers may be in contact with at least one primary contact surface, each group of primary rollers of the at least one group of primary rollers including at least one primary roller; and the at least one group of secondary rollers may be in contact with at least one secondary contact surface, each group of secondary rollers of the at least one group of secondary rollers including at least one secondary roller.

In some embodiments, the guiding rail may include at least one of an arc segment and/or a linear segment.

In some embodiments, the guiding rail may include a plurality of arc segments, and directions of the plurality of arc segments are different.

In some embodiments, the at least one group of primary rollers may include plurality of primary rollers.

In some embodiments, a count of the plurality of primary contact surfaces may be two, and the two primary contact surfaces are respectively located on both sides of the guiding rail along the first direction; the at least one group of primary rollers may include a first group of primary rollers and a second group of primary rollers, and the first group of primary rollers and the second group of primary rollers are respectively in contact with the two primary contact surfaces; the guiding rail may be an arc-shape, and the first group of primary rollers and the second group of primary rollers are respectively located on both sides of the guiding rail along the first direction; and a first wheelbase may be between plurality of primary rollers of the first group of primary rollers, a second wheelbase may be between plurality of primary rollers of the second group of primary rollers, and the first wheelbase may be greater than the second wheelbase.

In some embodiments, an elastic member may be arranged between the plurality of primary rollers of the first group of primary rollers, and/or arranged between the plurality of primary rollers of the second group of primary rollers.

In some embodiments, the at least one group of secondary rollers may include plurality of secondary rollers.

In some embodiments, a count of the plurality of secondary contact surfaces may be four, and two secondary contact surfaces of the four secondary contact surfaces are provided on each of two sides of the each of the plurality of primary contact surfaces along the second direction, and a count of the groups of secondary rollers may be plurality of, an outer side of the at least one primary surface along the first direction may be provided with at least one group of secondary rollers, plurality of secondary rollers of each group of secondary rollers are respectively in contact with the two secondary contact surfaces along the second direction.

In some embodiments, a group of secondary rollers may be arranged in front of each of the at least one group of primary rollers and/or behind each of the at least one group of primary rollers.

In some embodiments, the at least one group of primary rollers may include two primary rollers, and the two primary rollers are arranged adjacent to each other along the length direction of the guiding rail.

In some embodiments, the guiding rail may include two primary contact surfaces and four secondary contact surfaces, two side surfaces of the guiding rail along the first direction are provided with a primary contact surface and two secondary contact surfaces respectively, a count of the at least one group of primary rollers may be two, and the two groups of primary rollers are respectively tangent to two primary contact surfaces on the two side surfaces of the guiding rail along the first direction, and a count of the at least one group of secondary rollers may be at least four, and a group of the secondary rollers may be arranged in front of and behind each group of the two groups of primary rollers.

In some embodiments, the rolling axis of the primary rolling part may be perpendicular to the rolling axis of the secondary rolling part.

In some embodiments, the slider may include a moving platform and at least one cantilever, the at least one cantilever being arranged on a bottom surface of the moving platform near the guiding rail, and extending toward the guiding rail, and each cantilever of the at least one cantilever being provided with a group of secondary rollers.

In some embodiments, both sides of the guiding rail along the first direction are provided with a cantilever, and the at least one group of primary rollers may be arranged on the bottom surface of the moving platform, and the group of secondary rollers may be arranged on an inner side of a cantilever towards the guiding rail.

In some embodiments, the bottom surface of the moving platform abuts against a top surface of the guiding rail.

In some embodiments, each side surface of the guiding rail is provided with a sliding groove, each sliding groove has an inner bottom surface, an inner top surface, and an inner side surface, the inner side surface of the sliding groove may be a primary contact surface of the plurality of primary contact surfaces, and the inner bottom surface and the inner top surface of the sliding groove are two secondary contact surfaces of the plurality of secondary contact surfaces respectively.

According to another aspect of the present disclosure, a cable management apparatus is provided. The cable management apparatus may include a bottom plate; a wire wheel; and a transmission mechanism, wherein the transmission mechanism may be arranged on the bottom plate, the wire wheel may be movably arranged on the transmission mechanism, and the transmission mechanism may be configured to provide guidance for a movement of the wire wheel, wherein the transmission mechanism includes: a guiding rail; and a slider movably disposed on the guiding rail, wherein the slider may be provided with a rolling part, the rolling part rolls with respect to the guiding rail, and limits the slider in a first direction and a second direction of the guiding rail, and the first direction and the second direction are both perpendicular to a length direction of the guiding rail, and an angle between the first direction and the second direction may be greater than 0° and less than 180°.

According to another aspect of the present disclosure, a medical device is provided. The medical device may include a mechanical arm; a C-arm connected with the mechanical arm; and a cable management apparatus, wherein the cable management apparatus includes a cable, one end of the cable being fixedly connected with the mechanical arm, and the other end of the cable being fixedly connected with the C-arm, wherein the cable management apparatus further includes: a bottom plate; a wire wheel; and a transmission mechanism, wherein the transmission mechanism may be arranged on the bottom plate, the wire wheel may be movably arranged on the transmission mechanism, and the transmission mechanism may be configured to provide guidance for a movement of the wire wheel, wherein the transmission mechanism includes: a guiding rail; and a slider movably disposed on the guiding rail, wherein the slider is provided with a rolling part, the rolling part rolls with respect to the guiding rail, and limits the slider in a first direction and a second direction of the guiding rail, and the first direction and the second direction are both perpendicular to a length direction of the guiding rail, and an angle between the first direction and the second direction may be greater than 0° and less than 180°.

BRIEF DESCRIPTION OF THE DRAWINGS

The present disclosure is further illustrated in terms of exemplary embodiments, and these exemplary embodiments are described in detail with reference to the drawings. These embodiments are not limited. In these embodiments, the same numeral indicates the same structure, wherein.

DETAILED DESCRIPTION

Figure 1:
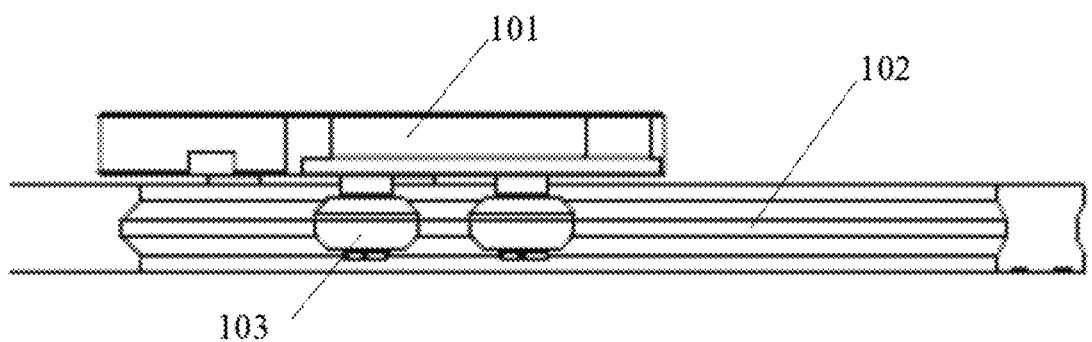
FIG. 1 is a schematic diagram illustrating an exemplary arc-shaped transmission mechanism according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The terms "center," "longitudinal," "transverse," "length," "width," "thickness," "upper," "lower," "front," "rear," "left," "right," "perpendicular," "horizontal," "top," "bottom," "inner," "outer," "clockwise," "counterclockwise," "axial," "radial," or "circumferential direction," or the like, indicating to a direction or a positional relationship are based on a direction or a positional relationship shown in the drawings. These terms are merely for the convenience of describing the present disclosure and simplifying the description, and does not indicate or imply that the device or element referred to must have a specific orientation, be constructed and operated in a specific orientation. Therefore, it cannot be understood as limitations of the present disclosure.

In the present disclosure, unless otherwise specified and defined, the terms "installation," "connection," "fixation," or other terms shall be understood in a broad sense, for example, they can be fixed connection, detachable connection, or integrated. It may be mechanically connected, electrically connected or communicable with each other. It may be directly connected, or connected through an intermediate medium, or it may be the communication between two elements or the interaction relationship between two elements, unless otherwise specified. For those of ordinary skill in the art, the specific meanings of the above terms in the present disclosure may be understood according to specific circumstances. In the present disclosure, a length direction of the guiding rail may be an extension direction of the guiding rail.

In some embodiments, a cable management apparatus may be applied to a mechanical arm or a robot in different industries, such as an industrial robot, a medical robot, a large-scale medical equipment, or the like. The industrial robot may include a handling robot, a welding robot, a laser working robot, a cleaning robot, or the like. The medical robot may include a surgical robot, a rehabilitation robot, a transport robot, a rescue robot, or the like. The large-scale medical equipment may include a digital subtraction angiography (DSA), a digital breast tomography (DBT), or the like. Merely by way of example, a welding robot is used for explanation: an end of an arm of the welding robot is equipped with an operating instrument (e.g., a welding gun), and the welding gun is connected with a cable that provides welding power. During an operation of welding, the end of the arm drives the welding gun to move, and the end of the arm drives the cable to move to elongate or shorten the cable. In order to avoid an entanglement between the cable and the arm during the movements of the welding gun, the cable may be stored or guided by a transmission mechanism of the cable management apparatus, and the cable may be taken up or released during the movements of the welding gun.

FIG. 1 is a schematic diagram illustrating an exemplary arc-shaped transmission mechanism according to some embodiments of the present disclosure. As shown in FIG. 1, a transmission mechanism 100 may include a slider structure 101 and a guiding rail structure 102. The slider structure 101 may be movably disposed on the guiding rail structure 102. The slider structure 101 may be provided with a rolling device 103. The rolling device 103 may roll on the guiding rail structure 102 to make the slider structure 101 to slide. A plurality of side surfaces of the rolling device 103 may be in contact with a plurality of side surfaces of the guiding rail structure 102. However, since the machining accuracy of the guiding rail structure 102 and the slider structure 101 may not be high, it is difficult for the plurality of side surfaces of the rolling device 103 to contact with the plurality of side surfaces of the guiding rail structure 102 at the same time, so that the slider structure 101 and the guiding rail structure 102 may be easy to move relatively in directions (e.g., a length direction of the guiding rail structure 102) other than a sliding direction. In addition, the low machining accuracy may make it difficult for the slider structure 101 to bear a large load, so that the transmission accuracy and bearing capacity may not low.

Figure 2:
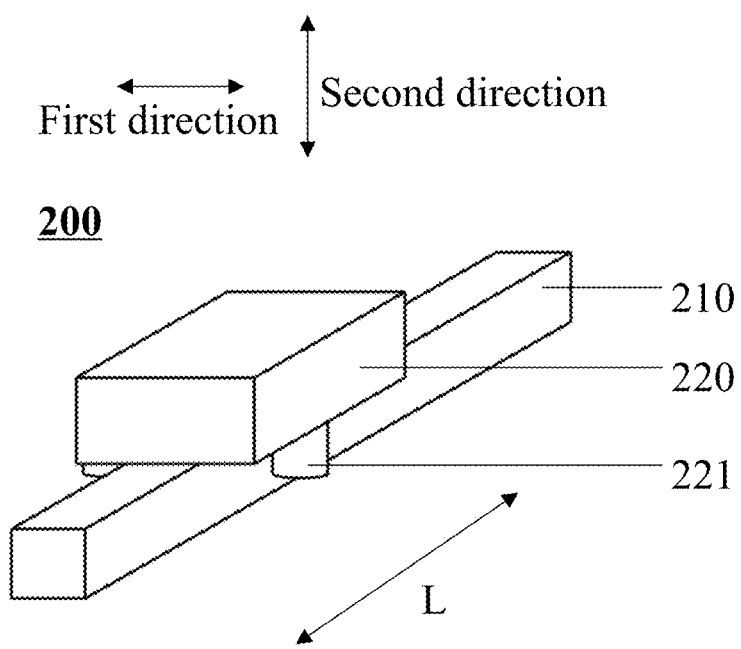
FIG. 2 is a schematic diagram illustrating an exemplary transmission mechanism according to some embodiments of the present disclosure.

FIG. 2 is a schematic diagram illustrating an exemplary transmission mechanism according to some embodiments of the present disclosure. As shown in FIG. 2, a transmission mechanism 200 may include a guiding rail 210 and a slider 220 movably disposed on the guiding rail 210. The slider 220 may be provided with a rolling part 221. The rolling part 221 may roll with respect to the guiding rail 210, and limit the slider 220 in a first direction and a second direction of the guiding rail 210. Both the first direction and the second direction may be perpendicular to a length direction (e.g., a direction shown by an arrow "L" in FIG. 2, also referred to as a length direction "L") of the guiding rail 210, and an angle between the first direction and the second direction may be greater than 0° and less than 180°. In some embodiments, by providing the rolling part 221 on the slider 220, the slider 220 may slide on the guiding rail 210. During a movement of sliding of the slider 220, the rolling part 221 may limit the slider 220 in the first direction and the second direction of the guiding rail 210, thus the slider 220 and the guiding rail 210 may not move relatively in other directions except a sliding direction (e.g., the length direction "L" shown in FIG. 2) of the guiding rail 210. Thus, the smoothness of sliding of the slider 220 may be improved. In addition, the rolling part 221 may also make the transmission mechanism 200 have a high operating accuracy, thus improving the working efficiency of the transmission mechanism 200. In addition to limit the slider 220, the rolling part 221 may also be provided to prevent the slider 220 from overturning in the first direction or the second direction, thereby improving the bearing capacity of the transmission mechanism 200.

Figure 3:
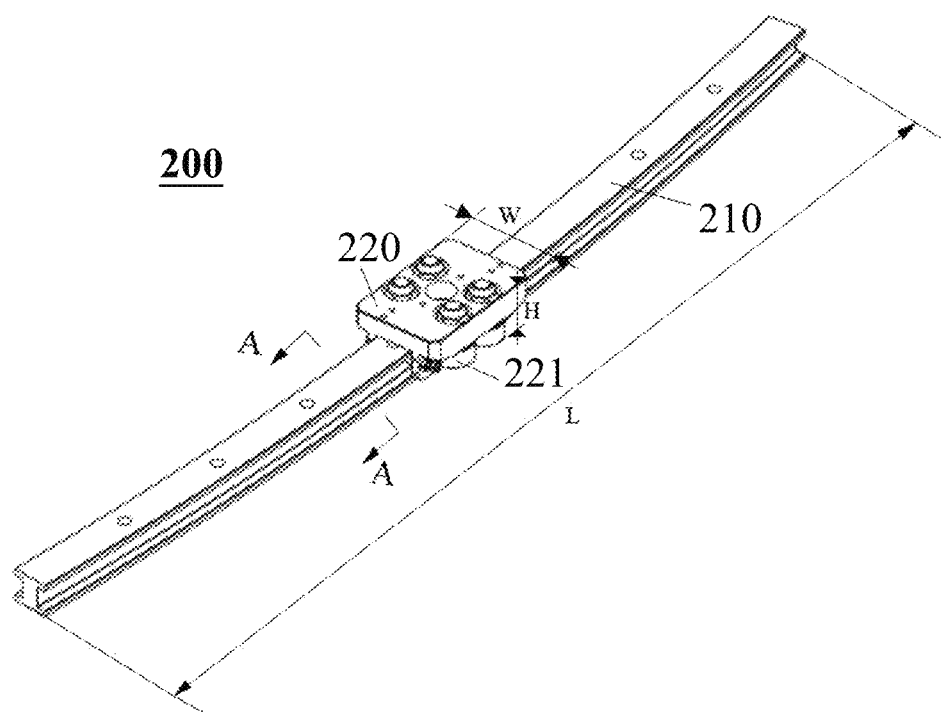
FIG. 3 is another schematic diagram illustrating an exemplary transmission mechanism according to some embodiments of the present disclosure.

FIG. 3 is another schematic diagram illustrating an exemplary transmission mechanism according to some embodiments of the present disclosure. In some embodiments, the first direction may be a direction shown by "W" in FIG. 3. For example, the first direction may be a width direction of the guiding rail 210. The second direction may be a direction shown by "H" in FIG. 3. For example, the second direction may be a height direction of the guiding rail 210.

It should be noted that shapes of the rolling part 221 and the guiding rail 210 may be various. As shown in FIG. 2, only positions of the components are illustrated, and the shapes of the components are not limited. The rolling part 221 may limit the slider 220 in the first direction and the second direction of the guiding rail 210 by a cooperation of the rolling part 221 and the guiding rail 210. Structure of the rolling part 221 and the shape of the guiding rail 210 may be described in FIGS. 5-10.

Figure 8:
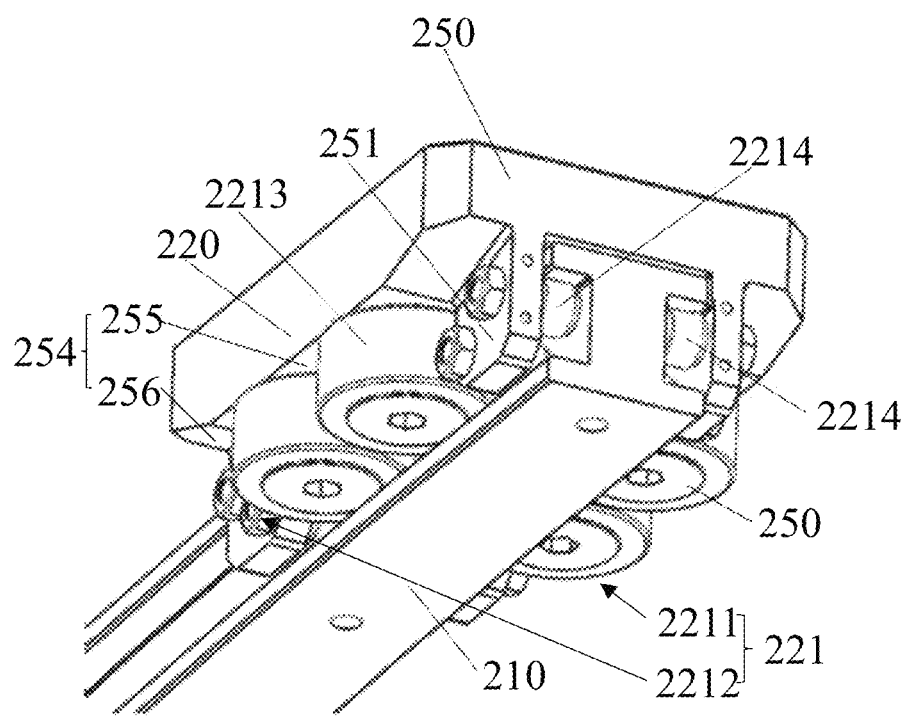
FIG. 8 is a schematic diagram illustrating a portion of an exemplary transmission mechanism according to some embodiments of the present disclosure.
Figure 9:
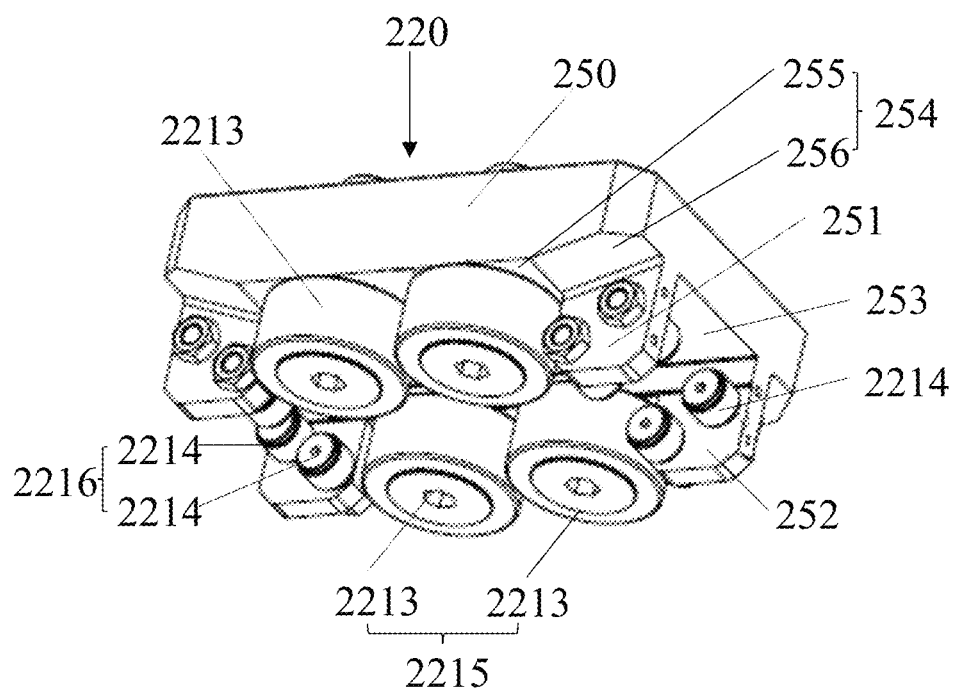
FIG. 9 is a schematic diagram illustrating an exemplary slider according to some embodiments of the present disclosure.

As shown in FIG. 3, the transmission mechanism 200 may include a guiding rail 210 and a slider 220. The slider 220 may include a rolling part 221. The rolling part 221 may be in contact to the guiding rail 210 and roll with respect to the guiding rail 210 along the length direction "L". In some embodiments, the rolling part 221 may cooperate with the guiding rail 210 to limit the slider 220 in the first direction "W" and the second direction "H". In some specific embodiments, the rolling part 221 may include a primary rolling part (e.g., a primary rolling part 2211 shown in FIG. 8) and a secondary rolling part (e.g., a secondary rolling part 2212 shown in FIG. 8). An angle between a rolling axis of the primary rolling part and a rolling axis of the secondary rolling part may be greater than 0° and less than 180°. More descriptions of the primary rolling part and the secondary rolling part may be found elsewhere in the present disclosure, for example, FIG. 6 and FIG. 7, and the descriptions thereof. The guiding rail 210 may include a plurality of primary contact surfaces (e.g., a primary contact surface 211 shown in FIG. 6 and FIG. 7) and a plurality of secondary contact surfaces (e.g., a secondary contact surface 212 shown in FIG. 6 and FIG. 7). More descriptions of the primary contact surfaces and the secondary contact surfaces may be found elsewhere in the present disclosure, for example, FIG. 6, FIG. 7, and the descriptions thereof. Each of the plurality of primary contact surfaces may be adjacent to at least one of the plurality of secondary contact surfaces. The plurality of primary contact surfaces may be perpendicular to the first direction "W", and the plurality of secondary contact surfaces may be perpendicular to the second direction "H". The plurality of primary contact surfaces may be configured to contact with the primary rolling part. The plurality of secondary contact surfaces may be configured to contact with the secondary rolling part. The rolling axis herein may refer to a central axis of a rolling shaft of a rolling member. Merely by way of example, as shown in FIG. 8 and FIG. 9, the rolling member of the primary rolling part 2211 may include a primary roller 2213, and a central axis of a rolling shaft of the primary roller 2213 may be the rolling axis of the primary rolling part 2211. The rolling member of the secondary rolling part 2212 may include a secondary roller 2214, and the central axis of the rolling shaft of the secondary roller 2214 may be the rolling axis of the secondary rolling part 2212.

In some embodiments, the primary rolling part (e.g., the primary rolling part 2211 shown in FIG. 8) may include at least one group of primary rollers (e.g., a group of primary rollers 2215 shown in FIG. 9). The group of primary rollers may include at least one primary roller (e.g., the primary roller 2213 shown in FIG. 8 and FIG. 9). The at least one group of primary rollers may be in contact with at least one primary contact surface (e.g., the primary contact surface 211 shown in FIG. 6 and FIG. 7) and roll with respect to the at least one primary contact surface. The contact between the at least one primary contact surface and the at least one group of primary rollers may refer that a rolling surface of a primary roller is in contact with the at least one primary contact surface. In some embodiments, the secondary rolling part (e.g., the secondary rolling part 2212 shown in FIG. 8) may include at least one group of secondary rollers (e.g., a group of secondary rollers 2216 shown in FIG. 9). The group of secondary rollers may include at least one secondary roller (e.g., secondary roller 2214 shown in FIG. 8 and FIG. 9). The at least one group of secondary rollers may be in contact with at least one secondary contact surface (e.g., the secondary contact surface 212 shown in FIG. 6 and FIG. 7) and roll with respect to the at least one secondary contact surface. The contact between the at least one secondary contact surface and the at least one group of secondary rollers may refer that a rolling surface of a secondary roller is in contact with a secondary contact surface. When a count of the at least one group of primary rollers is one, the group of primary rollers may contact one of the primary contact surfaces in the first direction of the guiding rail. When a count of the at least one group of secondary rollers is one, the group of secondary rollers can be in contact with two secondary contact surfaces on one side (along the first direction "W") of the guiding rail. In some embodiments, the group of secondary rollers and the group of primary rollers may be disposed on the same side of the guiding rail 210.

Figure 5:
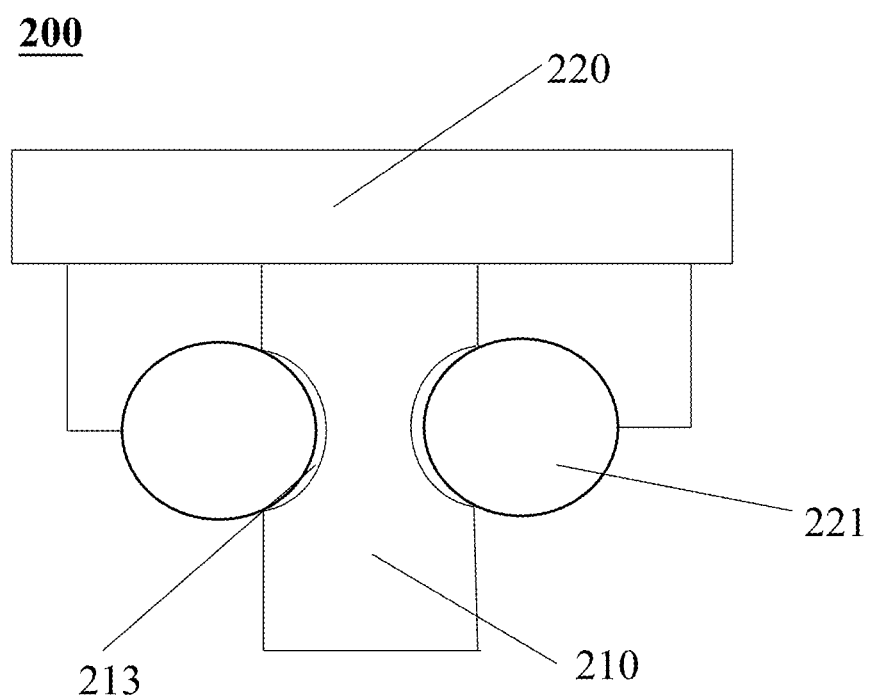
FIG. 5 is another schematic diagram illustrating an exemplary transmission mechanism according to some embodiments of the present disclosure.

FIG. 5 is another schematic diagram illustrating an exemplary transmission mechanism according to some embodiments of the present disclosure. In some embodiments, the rollers may be merely for illustrating an example rolling part 221, rather than limiting the rolling part 221. In some embodiments, the secondary rolling part may further include a crawler and a crawler gear. In some embodiments, the rolling part 221 may further include a roller, a universal wheel, or the like. Merely by way of example, as shown in FIG. 5, rolling grooves 213 including semicircular cross-sections may be provided on both sides of the guiding rail 210 in the first direction, and an arrangement direction of the rolling grooves 213 may be parallel to the length direction of the guiding rail 210. The rolling part 221 may be a universal wheel adapted to the rolling grooves, and the universal wheel may move with respect to the rolling grooves 213 along the length direction of the guiding rail 210. In some embodiments, the slider 220 may be limited in the second direction by an engagement of the rolling grooves 213 and the universal wheel. Meanwhile, since the rolling grooves 213 are provided on both sides of the guiding rail 210, the movement of the slider 220 in the first direction may be limited by the contact between the rolling grooves 213 and the universal wheel. In some embodiments, the cross-sections of the rolling grooves 213 may also be a semicircular arc or a superior arc. More descriptions of the rolling part may be found elsewhere in the present disclosure, for example, FIG. 8, FIG. 9, and the descriptions thereof.

Figure 4:
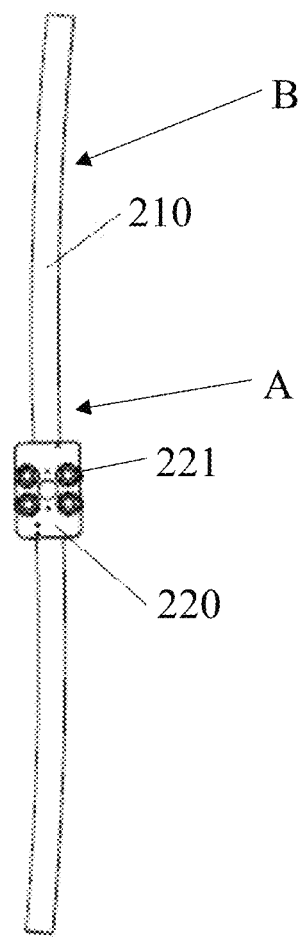
FIG. 4 is a schematic diagram illustrating an exemplary transmission mechanism in another direction according to some embodiments of the present disclosure.

FIG. 4 is a schematic diagram illustrating an exemplary transmission mechanism in another direction according to some embodiments of the present disclosure. As shown in FIG. 3 and FIG. 4, the guiding rail 210 may include an arc segment. In some embodiments, the guiding rail 210 may include a linear segment. The arc segment and the linear segment may refer to a shape of the guiding rail 210 in the length direction "L". In some embodiments, the guiding rail 210 may include both the arc segment and the linear segments. Merely by way of example, as shown along a direction of the arrow "A" in FIG. 4, the shape of the guiding rail 210 in the length direction "L" may be linear. When the slider 220 slides on the linear guiding rail 210, a movement direction of the slider 220 may be parallel to the length direction "L" of the guiding rail 210. As another example, as shown along a direction of the arrow "B" in FIG. 4, the shape of the guiding rail 210 in the length direction "L" may be an arc. When the slider 220 slides on the arc guiding rail 210, the movement direction of the slider 220 may be parallel to a tangential direction of the guiding rail 210 at a position where the slider 220 is located. In some embodiments, the arc segment may include a circular arc segment.

In some embodiments, the guiding rail 210 may include a plurality of sub-guiding rails of different shapes. For example, the guiding rail 210 may include a plurality of linear segments and a plurality of arc segments. The plurality of linear segments and arc segments may be connected in a specific order. In some embodiments, the guiding rail 210 may include a plurality of sub rails with the same shape. For example, the guiding rail 210 may be formed by connecting a plurality of linear segments. For another example, the guiding rail 210 may be formed by connecting a plurality of arc segments. The directions of the plurality of arc segments may be different. A direction of an arc segment may be a direction in which a midpoint of the arc segment points to the center of the arc segment. In some embodiments, a shape of the guiding rail 210 may include a linear shape, a "C" shape, an "S" shape, an "O" shape, or the like.

Figure 6:
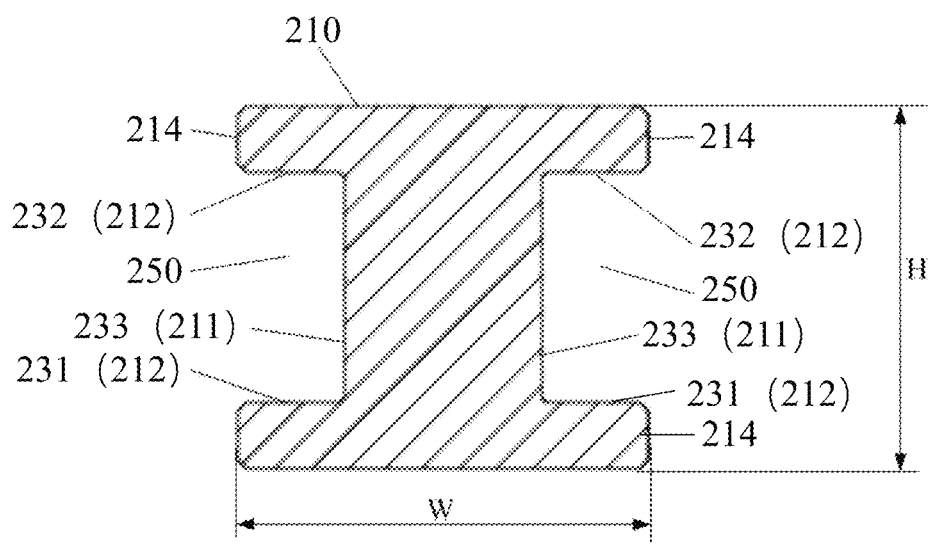
FIG. 6 is a sectional view illustrating section view guiding rail along A-A direction according to some embodiments of the present disclosure.
Figure 7:
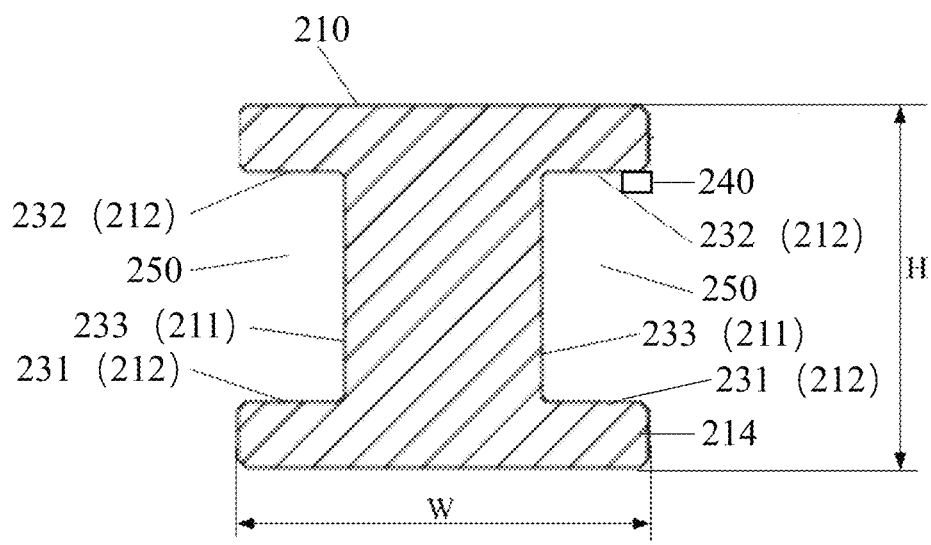
FIG. 7 is another sectional view illustrating an exemplary guiding rail according to some embodiments of the present disclosure.
Figure 10:
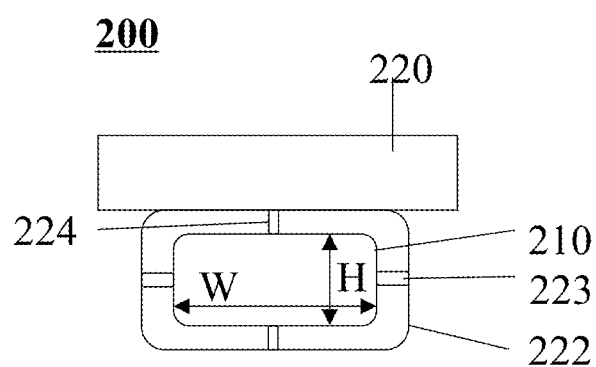
FIG. 10 is a sectional view illustrating an exemplary transmission mechanism according to some embodiments of the present disclosure.

In some embodiments, a shape of the cross-section of the guiding rail 210 may include a shape of an "H" (e.g., as shown in FIG. 6 and FIG. 7) shape that rotates 90 clockwise, a concave shape, an "H" shape, a rectangle, a quasi-rectangle (e.g., as shown in FIG. 10), and the like. The cross-section of the guiding rail 210 may refer to a section along the length direction of the guiding rail 210.

FIG. 6 is a sectional view illustrating section view guiding rail along A-A direction according to some embodiments of the present disclosure. As shown in FIG. 6, the guiding rail 210 may include the plurality of primary contact surfaces 211 and the plurality of secondary contact surfaces 212. Merely by way of example, the count of primary contact surfaces 211 may be two, and the count of secondary contact surfaces 212 may be four. The two primary contact surfaces 211 may be provided on both sides of the guiding rail 210 along the first direction "W". Two secondary contact surfaces 212 adjacent to each of the primary contact surfaces 211 may be oppositely arranged along the second direction "H". In another example, the count of the primary contact surfaces 211 may be two, and the count of the secondary contact surfaces 212 may be two. The two primary contact surfaces 211 may be provided on both sides of the guiding rail 210 along the first direction "W". Each of the primary contact surfaces 211 may be adjacent to one of the two secondary contact surfaces 212.

In some embodiments, a primary contact surface 211 and a secondary contact surface 212 may be arranged as a plane or an arc surface to be tangent to the primary rolling part (e.g., the primary rolling part 2211 in shown FIG. 8) and the secondary rolling part (e.g., the secondary rolling part 2212 shown in FIG. 8). In some embodiments, when the primary contact surface 211 and the secondary contact surface 212 are arranged in a plane or an arc surface, the rolling surfaces of the primary rolling part (e.g., the primary roller 2213 shown FIG. 8 and FIG. 9) and the secondary rolling part 2212 (e.g., the secondary roller 2214 shown FIG. 8 and FIG. 9) may be arranged in an appropriate shape. Merely by way of example, as shown in FIGS. 6-9, the primary contact surface 211 and the secondary contact surface 212 may be arranged in a plane, and the rolling surfaces of the primary roller 2213 and the secondary roller 2214 may be planes. In some embodiments, when the primary contact surface 211 and the secondary contact surface 212 are provided as arc surfaces, the primary contact surface 211 and the secondary contact surface 212 may be recessed inward or protruded outward. Accordingly, contact surfaces of the primary rolling part (e.g., the primary roller 2213 shown FIG. 8 and FIG. 9) and the secondary rolling part (e.g., the secondary roller 2214 shown FIG. 8 and FIG. 9) may be arranged in an appropriate shape.

In some embodiments, the arrangements of the primary contact surface 211 and the secondary contact surface 212 may be related to the shape of the cross-section of the guiding rail 210. For example, when the cross-section of the guiding rail 210 is a shape of an "H" that rotates 90 clockwise, both sides of the guiding rail 210 along the first direction may be recessed inward to form a groove (for example, the sliding groove 230 in FIG. 6 and FIG. 7). The bottom surface and the top surface of the groove may be designated as the secondary contact surfaces 212, and the side surfaces of the groove may be designated as the primary contact surfaces 211. For another example, when the cross-section of the guiding rail 210 is rectangular or other shapes (e.g., a quasi-rectangular), the primary contact surfaces 211 may be both side surfaces of the guiding rail 210 (as shown in FIG. 10), and the secondary contact surfaces may be the top surface and the bottom surface of the guiding rail 210.

The guiding rail 210 with a cross-section shaped an "H" shape that rotates 90 clockwise in the present disclosure may be as an example for detailed description as below.

In some embodiments, the primary contact surface 211 and the secondary contact surface 212 may be formed by inwardly recessing the side surfaces of the guiding rail 210 in the first direction.

In some embodiments, as shown in FIG. 6 and FIG. 7, two sliding grooves 230 may be respectively provided on the two side surfaces of the guiding rail 210 in the first direction, thus the shape of the cross-section of the guiding rail 210 may be an "H" shape that rotates 90 clockwise. Each sliding groove 230 may include an inner bottom surface 231, an inner top surface 232, and an inner side surface. For convenience of description, the inner side surface of the sliding groove 230 may be referred to as the first inner side surface 233. The bottom surface and the top surface herein may refer to surfaces located in the second direction (a direction shown by the arrow "W"), and a surface located upper may be top surface, a surface located lower may be the bottom surface. The inner bottom surface 231 and the inner top surface 232 may be both adjacent to the first inner side surface 233, and may be oppositely disposed along the second direction (a direction shown by the arrow "H"). The first inner side surface 233 may be perpendicular to the first direction (a direction shown by the arrow "W"), and may be used as the primary contact surface 211. The inner bottom surface 231 and the inner top surface 232 of the sliding groove 230 may be both perpendicular to the second direction "H", and may be used as two secondary contact surfaces 212, respectively. In some embodiments, by providing the sliding grooves 230 on both sides of the guiding rail 210 along the first direction, the shape of the guiding rail 210 may be easily processed as an arc-shape, thereby meeting use requirements of the guiding rail 210. In addition, by providing the sliding grooves 230, the slider 220 may operate with high accuracy on the guiding rail 210 with arc-shaped, and the working efficiency of the transmission mechanism 200 may be improved. In some embodiments, a depth direction of the sliding grooves 230 may be parallel to the first direction.

In some embodiments, the sliding groove 230 may also be provided on the top surface and/or the bottom surface of the guiding rail 210 along the second direction "H". The depth direction of the sliding groove 230 may be parallel to the second direction "H". When the sliding groove 230 is provided on the top surface or the bottom surface of the guiding rail 210 along the second direction "H", the shape of the cross-section of the guiding rail 210 may be similar to a concave shape.

FIG. 7 is another sectional view illustrating an exemplary guiding rail according to some embodiments of the present disclosure. As shown in FIG. 7, a block 240 may be provided on a side of the secondary contact surface 212 away from the primary contact surface 211, and the block 240 may be configured to limit the secondary rolling part (e.g., the secondary rolling part 2212 shown in FIG. 8). Merely by way of example, as shown in FIG. 7 and FIG. 8, the secondary rolling part 2212 may include a secondary roller 2214. When the block 240 is provided on the side of the secondary contact surface 212 away from the primary contact surface 211, the block 240 may contact the end surface of the secondary roller 2214 away from the primary contact surface 211, thereby limiting the movement of the secondary roller 2214 in the first direction "W", and ensuring the stability of the secondary roller 2214 during the movement. In addition, in some embodiments, the secondary roller 2214 may be disposed on a cantilever (e.g., the cantilever 251 in FIG. 8 and FIG. 9) of a moving platform (e.g., the moving platform 250 in FIG. 8 and FIG. 9), so that the block 240 may also contact the inner side surface of the cantilever (e.g., the second inner side surface 252 in and FIG. 9), thereby limiting the movement of the moving platform in the first direction and ensuring the stability of the moving platform during movement. In some embodiments, the two secondary contact surfaces 212 on each side of the guiding rail 210 may be provided with a block 240 respectively to further improve the stability of the secondary roller 2214 and the moving platform during movement. More descriptions of the moving platform and the cantilever may be found elsewhere in the present disclosure, for example, FIG. 8, FIG. 9 and the descriptions thereof, which may not be described herein.

In some embodiments, the guiding rail 210 may further include an outer side surface 214 adjacent to the secondary contact surface 212. The outer side surface 214 of the guiding rail 210 may be configured to abut against the inner side surface of the cantilever (e.g., the cantilever 251 in FIG. 8 and FIG. 9) to roughly limit the slider 220 and avoid large displacement of the slider 220 with respect to the guiding rail 210 in the first direction "W". Merely by way of example, as shown in FIG. 6, the inner top surface 232 and the inner bottom surface 231 of the sliding groove 230 may be designated as two secondary contact surfaces 212, and the first inner surface 233 may be designated as the primary contact surface 211. The inner top surface 232 and the inner bottom surface 231 of the sliding groove 230 may be respectively connected with the two outer side surfaces 214 of the guiding rail 210 at a side away from the first inner surface 233. The two outer side surfaces 214 may be distributed along the first direction, and both outer side surfaces 214 may extend along the second direction. In some embodiments, the outer side surfaces 214 of the guiding rail 210 may contact with the cantilever of the moving platform to limit the slider 220. More descriptions may be found elsewhere in the present disclosure, for example, FIG. 8, FIG. 9, and the descriptions thereof.

In some embodiments, the guiding rail 210 may be made of a metal material to reduce the elastic deformation of the guiding rail 210 and reduce a probability of fracture of the guiding rail 210. In some embodiments, the guiding rail 210 may be made of a wear-resistant metal material to make the primary contact surface 211 and secondary contact surfaces 212 of the guide rail 210 to be wear-resistant and improve the service life thereof. The metal material may include 40Cr Steel, 42CrMo, Cr12MoV or the like. In some embodiments, a yield strength of the metal material may be more than 540 MPa. For example, the yield strength of the metal material may be more than 550 MPa. As another example, the yield strength of the metal material may be more than 600 MPa.

In some embodiments, if a hardness of the guiding rail 210 is low, the surface of the guiding rail 210 may be recessed, thereby affecting the smoothness of the movement of the slider 220. Therefore, it is necessary to control the hardness of the metal material. In some embodiments, the hardness of the metal material may be in a range of 300 $N/mm^2$~400 $N/mm^2$. For example, the hardness of the metal material may be in a range of 320 $N/mm^2$~390 $N/mm^2$. As another example, the hardness of the metal material may be in a range of 340 $N/mm^2$~380 $N/mm^2$.

In some embodiments, a ratio of a size of the guiding rail 210 in the first direction to a size of the guiding rail 210 in the second direction may affect a performance of the guiding rail 210. When the ratio of the size of the guiding rail 210 in the first direction to the size of the guiding rail 210 in the second direction is too small, the shape of the cross-section of the guiding rail 210 may be a slice. At this time, the limiting effect on the slider 220 in the first direction may be poor and the slider 220 may overturn. When the ratio of the size of the guiding rail 210 in the first direction to the size of the guiding rail 210 in the second direction is too large, the shape of the cross-section of the guiding rail 210 may be a plate. At this time, the size of the guiding rail 210 in the second direction may be too small, and the size requirements of the secondary rolling part (e.g., the secondary rolling part 2212 in FIG. 8) may be strict, which may affect the limiting effect of the slider 220 in the first direction. For the above reasons, in some embodiments, the ratio of the size of the guiding rail 210 in the first direction to the size of the guiding rail 210 in the second direction may be in a range of 2~5. For example, the ratio of the size of the guiding rail 210 in the first direction to the size in the second direction may be in a range of 2.5~4.5. As another example, the ratio of the size of the guiding rail 210 in the first direction to the size in the second direction may be in a range of 2~3.

In some embodiments, the size of the guiding rail 210 in the first direction may be related to a diameter of the primary roller 2213. In some embodiments, the size of the guide rail 210 in the first direction may be greater than the diameter of the primary roller 2213. In some embodiments, the size of the guide rail 210 in the first direction may be less than twice the diameter of the primary roller 2213. In some embodiments, the size of the guiding rail 210 in the first direction may be in a range of 50 mm~80 mm. For example, the size of the guiding rail 210 in the first direction may be in a range of 55 mm~75 mm. As another example, the size of the guiding rail 210 in the first direction may be in a range of 60 mm~70 mm.

In some embodiments, the size of the guiding rail 210 in the second direction may be related to the diameter of the secondary roller 2214. In some embodiments, the size of the guide rail 210 in the second direction may be greater than the diameter of the secondary roller 2214. In some embodiments, the size of the guide rail 210 in the second direction may be less than twice the diameter of the secondary roller 2214. In some embodiments, the size of the guiding rail 210 in the second direction may be in a range of 10 mm~30 mm. For example, the size of the guiding rail 210 in the second direction may be in a range of 15 mm~25 mm. As another example, the size of the guiding rail 210 in the second direction may be in a range of 20 mm~25 mm.

In some embodiments, as shown in FIGS. 6-7, the distance between the two primary contact surface 211 may be a thickness of the guide rail 210. In order to avoid the guide rail 210 is broken when the primary roller 2213 is under an ultimate load, the thickness of guide rail 210 may satisfy a certain condition. In some embodiments, the thickness of the guide rail 210 may be negatively related to the yield strength of the material of which the guide rail 210 is made. In some embodiments, the thickness of the guiding rail 210 may be in a range of 6 mm~18 mm. For example, the thickness of the guiding rail 210 may be in a range of 8 mm~14 mm. As another example, the thickness of the guiding rail 210 may be in a range of 10 mm~12 mm. Merely by way of example, the material of the guide rail 210 may be 40Cr, and the thickness of the guiding rail 210 may be 12 mm.

FIG. 8 is a schematic diagram illustrating a portion of an exemplary transmission mechanism according to some embodiments of the present disclosure. FIG. 9 is a schematic diagram illustrating an exemplary slider according to some embodiments of the present disclosure. As shown in FIG. 8 and FIG. 9, a count of the at least one group of primary rollers 2215 may be at least two, and the two primary contact surfaces 211 may be in contact with at least one group of primary rollers 2215. A count of the at least one group of secondary rollers 2216 may be at least two, and the primary contact surface 211 may be provided with at least one group of secondary rollers 2216 along the outer side in the first direction "W". Accordingly, since at least one group of primary rollers 2215 and at least one group of secondary rollers 2216 are provided on both sides of the guiding rail 210 in the first direction, the slider 220 may be kept balanced and the stability of the slider 220 during movement may be improved.

In some embodiments, the rolling axis of the primary rolling part 2211 may be perpendicular to the rolling axis of the secondary rolling part 2212 to facilitate the sliding of the slider 220 on the guiding rail 210 and limit the of the slider 220.

In some embodiments, the count of secondary contact surfaces 212 may be four, and two of the four secondary contact surfaces 212 may be provided on both sides of each primary contact surface 211 in the second direction (e.g., a direction shown by "H" in FIG. 6). At least two secondary rollers 2214 in each group of secondary rollers 2216 may be in contact with two secondary contact surfaces 212 in the second direction, respectively. More descriptions may be found elsewhere in the present disclosure, for example, FIG. 8, FIG. 9, and the descriptions thereof. In this way, not only the slider 220 may be limited in the second direction, but also the slider 220 may be prevented from overturning in the second direction, thereby improving the bearing capacity of the transmission mechanism 200.

In some embodiments, as shown in FIG. 8 and FIG. 9, a group of secondary rollers 2216 may be arranged in front of each of the at least one group of primary rollers 2215 and/or behind each of the at least one group of primary rollers 2215. Positions of the front of the group of primary rollers 2215 or behind each of the at least one group of primary rollers 2215 may refer to both sides of each of the at least one group of primary rollers 2215 along the length direction "L". Accordingly, providing the group of secondary rollers 2216 in front of each of the at least one group of primary rollers 2215 and/or behind each of the at least one group of primary rollers 2215 may further prevent the slider 220 from overturning in the first direction (e.g., a direction shown by "W" in FIG. 6) and the second direction (e.g., a direction shown by "H" in FIG. 6), thereby further improving the bearing capacity of the transmission mechanism 200. A position of the front of the group of primary rollers 2215 may refer to a side in a forward direction of the slider 220, and a position of behind the group of primary rollers 2215 may refer to a side in an opposite direction to the forward direction of the slider 220. In other embodiments, the position of front of the group of primary rollers 2215 may refer to the side opposite to the forward direction of the slider 220, and the position of behind the group of primary rollers 2215 may refer to the side along the forward direction of the slider 220.

In some embodiments, as shown in FIGS. 6-9, the guiding rail 210 may include one primary contact surface 211 and two secondary contact surfaces 212 on both sides along the first direction "W". The count of the at least one group of primary rollers 2215 may be two, and one primary contact surface 211 may be tangent to the two groups of primary rollers 2215. The count of at least one group of secondary rollers 2216 may be four, and a group of secondary rollers 2216 may be provided in front of or behind each of the two groups of primary rollers 2215. In some embodiments, tangency may refer that an outer peripheral surface (e.g., the peripheral wall of a cylinder) of a roller may be in an inner or outer tangent relationship with a corresponding contact surface. In some embodiments, a wire wheel (e.g., a wire wheel 320 shown in FIG. 12) may be arranged on the slider 220, and a cable (e.g., a cable 340 shown in FIG. 12) may be wound to the wire wheel during the operation of the transmission mechanisms 200, thereby the wire wheel moving on the slider by the cable. The cable may apply an offset pressure to the wire wheel, and be transmitted to the slider 220. By arranging a group of secondary rollers 2216 in front of and behind each of the at least one group of primary rollers 2215, the effect of offset pressure may be effectively offset, so as to improve the service life of guide rail 210. More descriptions may be found elsewhere in the present disclosure, for example, FIG. 12 and the descriptions thereof.

In some embodiments, the count of the group of primary rollers 2215 and the group of secondary rollers 2216 may be more. For example, the count of the group of primary rollers 2215 may be four, six, eight, or the like. In some embodiments, the count of the group of secondary rollers 2216 may be two more than the count of the group of primary rollers 2215. The group of primary rollers 2215 and the group of secondary rollers 2216 may be alternately arranged along the length direction of the guiding rail 210.

In some embodiments, the slider 220 may further include a first mounting groove (not shown), and an arrangement direction of the first mounting groove may be parallel to the first direction (e.g., the direction "W" in FIG. 6). The group of primary rollers 2215 may be installed in the first mounting groove so that the group of primary rollers 2215 may move with respect to the first mounting groove in the first direction. The arrangement direction may refer to an extension direction of the first mounting groove. By providing the first mounting groove, the group of primary rollers 2215 may be moved in the first direction. Accordingly, when the slider 220 is installed, an operator may adjust the position of the group of primary rollers 2215 based on a size of the guiding rail 210 in the first direction, so that the slider 220 may adapt to the guiding rails 210 with different sizes, and the applicability of the slider 220 may be improved. In some embodiments, the first mounting groove may be provided on the bottom surface of the slider 220, and a rolling shaft of the primary roller 2213 may be provided in the first mounting groove and movable with respect to the first mounting groove in the first direction.

In some embodiments, the slider 220 may further include a second mounting groove (not shown), and an arrangement direction of the second mounting groove may be parallel to the first direction. The group of secondary rollers 2216 may be installed in the second mounting groove, so that the group of secondary rollers 2216 may move with respect to the second mounting groove in the first direction. Accordingly, when the slider 220 is installed, the operator may adjust the position of the group of secondary rollers 2216 based on the size of the guiding rail 210 in the first direction. In some embodiments, the second mounting groove may be arranged on the bottom surface of the slider 220, and the rolling shaft of the secondary roller 2214 may be arranged in the second mounting groove, and may move with respect to the second mounting groove in the first direction. For example, as shown in FIG. 8 and FIG. 9, the rolling shaft of the secondary roller 2214 may be disposed on the side wall of the cantilever 251 of the moving platform 250, and the upper end of the cantilever 251 may be disposed in the second mounting groove.

In some embodiments, when at least one group of primary rollers 2215 are provided on both sides of the guiding rail 210 in the first direction, the opposite two groups of primary rollers 2215 may be arranged in the same first mounting groove. Accordingly, when at least one set of group of secondary rollers 2216 are provided on both sides of the guiding rail 210 in the first direction, the two opposite groups of secondary rollers 2216 may be provided in the same second mounting groove.

In some embodiments, as shown in FIG. 8 and FIG. 9, each group of primary rollers 2215 may include at least two primary rollers 2213, and at least two primary rollers 2213 may be arranged adjacent to each other along the length direction of the guiding rail. In some embodiments, the adjacent arrangement may refer that the rolling shafts of the primary rollers 2213 may be arranged in parallel along the length direction of the guiding rail 210. Merely by way of example, each group of primary rollers 2215 may include two primary rollers 2213, which may be disposed adjacent to each other along the length direction of the guiding rail 210. In some embodiments, the count of primary rollers 2213 in each group of primary rollers 2215 may not be limited to two, for example, the count of primary rollers 2213 may be three, four, or more.

In some embodiments, the group of primary rollers 2215 may include at least two primary rollers 2213. A wheelbase between at least two primary rollers 2213 of the group of primary rollers 2215 (e.g., the first group of primary rollers) located outside the guiding rail 210 may be the first wheelbase. A wheelbase between at least two primary rollers 2213 of the group of primary rollers 2215 (e.g., the second group of primary rollers) located inside the guiding rail 210 may be the second wheelbase, and the first wheelbase may be greater than the second wheelbase to avoid the group of primary rollers 2215 located on the outside being stuck and unable to move when the slider 220 moves on the guiding rail with arc-shaped, thereby effectively improving the smoothness of the slider 220 movement.

In some embodiments, an elastic member may be arranged between the at least two primary rollers of the first group of primary rollers (e.g., the group of primary rollers 2215 located outside the guiding rail 210), and/or may be arranged between the at least two primary rollers of the second group of primary rollers (e.g., the group of primary rollers 2215 located inside the guiding rail 210). The elastic member may be configured to adjust the wheelbase between the primary rollers 2213. Merely by way of example, when the slider 220 moves on the guiding rail with arc-shaped, the guide rail 210 may apply the first force on the primary roller 2213 of the first group of primary rollers. Due to the elastic member, a component force of the first force along the length of guide rail 210 may make the primary roller 2213 of the first group of primary rollers move against each other, thereby increasing the first wheelbase. Correspondingly, the guide rail 210 may apply the second force on the primary roller 2213 of the second group of primary rollers. Due to the elastic member, the component force of the second force along the length of guide rail 210 may make the primary roller 2213 of the first group of primary rollers move toward each other, thereby increasing the first wheelbase.

In some embodiments, a groove (not shown) may be provided on the bottom surface of the slider 220, and an extension direction of the groove may be parallel to the length direction (e.g., a direction shown by "L" in FIG. 4) of the guiding rail 210. The rolling shafts of at least two primary rollers 2213 of each group of primary rollers 2215 may be arranged in the groove and move along the groove. The elastic member (e.g., a spring) may be disposed between two rolling shafts of at least two primary rollers 2213. In some embodiments, the minimum elastic force of the elastic member may be greater than a friction between the primary rollers 2213 and the primary contact surface 211 to avoid affecting a normal motion of the slider 220. In some embodiments, the component forces of the first forces and second forces along the length of the guide rail 210 may be less than the maximum elastic force of the elastic member.

In order to improve the stability of the slider 220 when the slider 220 moves, a predetermined stress may be provided between the end surface of the primary roller 2213 and the guiding rail 210 when installing the slider 220. In some embodiments, end surfaces of the primary roller 2213 may refer to two surfaces of the primary roller 2213 in the second direction (e.g., the direction shown by "H" in FIG. 6). Merely by way of example, as shown in FIGS. 6-9, the primary roller 2213 may be interference fitted with the inner top surface 232 and the inner bottom surface 231 of the sliding groove 230, so that the primary roller 2213 and the inner top surface 232 and the inner bottom surface 231 of the sliding groove 230 have a predetermined stress. The predetermined stress may make the primary roller 2213 more firmly arranged in the sliding groove 230, shakings of the primary roller 2213 in the second direction may be reduced, and the stability of movement may be improved. In addition, it should be noted that the primary roller 2213 on one side of the guide rail 210 may still fit the guide rail 210 when the primary roller 2213 on the other side of the guide rail 210 is pressed under a partial load force.

When the predetermined stress is too large, a friction between the end surface of the primary roller 2213 and the guiding rail 210 may be too large, and the primary roller 2213 may not move smoothly. When the predetermined stress is too small, the shakings of the slider may not be effectively reduced. In some embodiments, the predetermined stress between the end surface of the primary roller 2213 and the guiding rail 210 may be in a range of 10N~100N. For example, the predetermined stress between the end surface of the primary roller 2213 and the guiding rail 210 may be in a range of 20N~80N. As another example, the predetermined stress between the end surface of the primary roller 2213 and the guiding rail 210 may be in a range of 40N~60N.

In some embodiments, the group of secondary rollers 2216 may include at least two secondary rollers 2214. Merely by way of example, as shown in FIG. 8 and FIG. 9, the group of secondary rollers 2216 may include two secondary rollers 2214.

In the above embodiments, the descriptions of the count of the secondary rollers 2214 included in the group of secondary rollers 2216 is merely for illustration purpose. Those skilled in the art may also designate the count of the secondary rollers 2214 included in the group of secondary rollers 2216 as other values accordingly. For example, the count of the secondary rollers 2214 included in the group of secondary rollers 2216 may also be three, four, or more, which may not be described herein.

In some embodiments, the arrangement of the secondary rollers 2214 may be related to the count of secondary rollers 2214 in each group of secondary rollers 2216.

In some embodiments, the secondary roller 2214 and the secondary contact surface 212 may be in double-sided contact. That is, the secondary roller 2214 may be in contact with two secondary contact surfaces 212 at the same time. Merely by way of example, if the primary contact surface 211 on each side of the guiding rail 210 is adjacent to two secondary contact surfaces 212, when the count of secondary rollers 2214 in each group of secondary rollers 2216 is one, the secondary roller 2214 may contact the two secondary contact surfaces 212 at the same time.

In some embodiments, the secondary roller 2214 and the secondary contact surface 212 may be in single-sided contact. That is, the secondary roller 2214 may be in contact with only one secondary contact surface 212. Structures of the single-sided contact may be simple, and a position of the secondary roller 2214 may be easily adjusted to ensure that the secondary roller 2214 is tangent to the secondary contact surface 212. Thus, the influence of the machining accuracy of the slider 220 or the guiding rail 210 on the limiting effect of the slider 220 may be reduced. In addition, the single-sided contact may make the slider 220 always be located on the guiding rail 210 when sliding, and ensure the operating accuracy of the transmission mechanism 200.

For example, if the count of secondary contact surfaces 212 adjacent to the primary contact surface 211 on each side of the guiding rail 210 is one, when the count of secondary rollers 2214 in each group of secondary rollers 2216 is one, the highest point or the lowest point of the secondary roller 2214 may be in contact with the secondary contact surface 212.

In another example, as shown in FIG. 8 and FIG. 9, the primary contact surface 211 on each side of the guiding rail 210 may be adjacent to two secondary contact surfaces 212. If the count of secondary rollers 2214 in each group of secondary rollers 2216 is two, the two secondary rollers 2214 may be arranged along the second direction, and the rolling shafts of the two secondary rollers 2214 may be parallel to each other. The highest point of an upper secondary roller 2214 of the two secondary rollers 2214 may be in contact with the upper secondary contact surface 212 (e.g., the inner top surface 232 of the sliding groove 230), and the lowest point of the lower secondary roller 2214 of the two secondary rollers 2214 may be in contact with the lower secondary contact surface 212 (e.g., the inner bottom surface 231 of the sliding groove 230). As used herein, the word "upper" may refer to "diagonally above" or "directly above", and the word "lower" may refer to "diagonally below" or "directly below". Accordingly, the secondary rollers 2214 according to some embodiments of the present disclosure may make the primary rollers 2213 located on the other side of the guide rail 210 still fit the guide rail 210 when the primary rollers 2213 located on one side of the guide rail 210 is pressed under the partial load force.

In another example, if the count of secondary rollers 2214 in each group of secondary rollers 2216 is three, four, or more, the lowest point of a portion of the secondary rollers 2214 may contact the lower secondary contact surface 212, and the highest point of the other portion of the secondary rollers 2214 may contact the upper secondary contact surface 212, and the rolling shafts of these secondary rollers 2214 may be parallel to each other.

In some embodiments, the secondary rolling part 2212 may further include a crawler (not shown) and a crawler gear (not shown). The crawler gear may be rotatably provided on the slider 220. The crawler may be meshed with the crawler gear and supported on the slider 220 by the crawler gear. The crawler may move with respect to the secondary contact surface 212 under the driving of the secondary roller 2214. In some embodiments, by providing a crawler between the secondary roller 2214 and the secondary contact surface 212, the secondary roller 2214 may not directly contact the secondary contact surface 212. The secondary roller 2214 may drive the crawler to move through the secondary roller 2214, thus the crawler may move with respect to the secondary contact surface 212. Accordingly, since the sliding friction received by the crawler during the movement with respect to the secondary contact surface 212 is smaller, the movement of the slider 220 may be smoother.

In some embodiments, the selection of the primary roller 2213 and the secondary roller 2214 may affect the service life of the transmission mechanism. In some embodiments, the selection of the primary roller 2213 and the secondary roller 2214 may be determined by a force and a force direction of the primary roller 2213 and the secondary roller 2214. For example, the force of the primary roller 2213 is 500N, and the force direction is perpendicular to an axial direction of the primary roller 2213. Considering the harsh working conditions of long-term use, the safety factor is 8 times, so a design load of the contact surface of the primary roller 2213 may be more than 4 kN. For another example, the force of the secondary roller 2214 is 500N, and the force direction is perpendicular to the axial direction of the secondary roller 2214. Considering that the secondary roller 2214 plays a guiding role, the safety factor is 4 times, and the design load of the contact surface of the secondary roller 2214 may be greater than 0.2 kN. In some embodiments, the diameters of the primary roller 2213 and the secondary roller 2214 may be associated with loads that the primary roller 2213 and the secondary roller 2214. In some embodiments, a ratio of a diameter of the primary roller 2213 to a diameter of the secondary roller 2214 may be in a range of 2~5. For example, the ratio of the diameter of the primary roller 2213 to the diameter of the secondary roller 2214 may be in a range of 2.5~4.5. As another example, the ratio of the diameter of the primary roller 2213 to the diameter of the secondary roller 2214 may be in a range of 3~4.

In some embodiments, the diameter of the primary roller 2213 may be in a range of 20 mm~30 mm. For example, the diameter of the primary roller 2213 may be in a range of 22 mm~28 mm. As another example, the diameter of the primary roller 2213 may be in a range of 24 mm~26 mm. Merely by way of example, the diameter of the primary roller 2213 may be 26 mm.

In some embodiments, the diameter of the secondary roller 2214 may be in a range of 4 mm~12 mm. For example, the diameter of the secondary roller 2214 may be in a range of 6 mm~10 mm. As another example, the diameter of the secondary roller 2214 may be in a range of 6 mm~8 mm. Merely by way of example, the diameter of the primary roller 2213 may be 8 mm.

In some embodiments, as shown in FIG. 8 and FIG. 9, the slider 220 may further include a moving platform 250 and at least one cantilever 251. The at least one cantilever 251 may be disposed on the bottom surface of the moving platform 250 near the guiding rail 210, and may extend toward the guiding rail 210. Each cantilever 251 of the at least one cantilever 251 may be provided with a group of secondary rollers 2216.

In some embodiments, the count of the at least one cantilever 251 may be at least two, and both sides of the guiding rail 210 along the first direction (e.g., the direction shown by "W" in FIG. 4) may be provided with a cantilever. The primary roller 2213 may be rotatably disposed on the bottom surface of the moving platform 250, and the rolling axis of the primary roller 2213 may be perpendicular to the bottom surface of the moving platform 250. The secondary roller 2214 may be rotatably disposed on the inner side of the cantilever 251 towards the guiding rail 210, and the rolling axis of the secondary roller 2214 may be parallel to the bottom surface of the moving platform 251. For convenience of description, the inner side of the cantilever 251 towards the guiding rail 210 may be referred to as a second inner side 252.

When the slider 220 matches with the guiding rail 210, at least two cantilevers may be symmetrically distributed on both sides of the guiding rail 210 in the first direction. Accordingly, each cantilever 251 may be provided with a group of secondary rollers 2216, to limit the slider 220 in the second direction (e.g., the direction shown by "H" in FIG. 6) at two symmetrical positions. Thus, the height of two sides of the sliders 220 on both sides of the guiding rail 210 may be consistent, and the stability of the movement of the slider 220 may be improved. In addition, this arrangement may effectively simplify the structures of the slider 220, and make it easier for the primary roller 2213 and the secondary roller 2214 to be vertically arranged on the slider 220. In some embodiments, the rolling shaft of the secondary roller 2214 may be fixed to the second inner side 252 of the cantilever 251 by a screw and a nut.

In some embodiments, as shown in FIG. 8 and FIG. 9, the count of the at least one cantilever 251 may be four. The four cantilevers 251 may be symmetrically arranged on opposite sides of the guiding rail 210. Two cantilevers 251 may be arranged on each side of the guiding rail 210. The two cantilevers 251 may be distributed along the length direction of the guiding rail 210 with an interval. Two secondary rollers 2214 may be arranged on each of the four cantilevers 251. In some embodiments, the group of primary rollers 2215 may be disposed between two cantilevers 251 on each side of the guiding rail 210. Merely by way of example, the count of the group of primary rollers 2215 may be two, which may be provided on both sides of the guiding rail 210. Each group of primary rollers 2215 may include two primary rollers 2213, which may be arranged between two cantilevers 251 on one side of the guiding rail 210.

In other embodiments, two cantilevers 251 may be provided on each side of the guiding rail 210, and at least two groups of primary rollers 2215 may be provided between the two cantilevers 251. In some embodiments, since the two cantilevers 251 on each side of the guiding rail 210 are distributed with the interval, thus the height of two sides of the slider 220 on both sides of the guiding rail 210 may be consistent, thereby ensuring a horizontal movement of the moving platform 250 along the length direction of the guiding rail 210.

In some embodiments, as shown in FIG. 8, the bottom surface 253 of the moving platform may abut against the top surface of the guiding rail 210. Accordingly, a weight of the slider 220 may be borne by the guiding rail 210 without being borne by the primary roller 2213 and the secondary roller 2214. Thus, the deformation of the primary roller 2213 and the secondary roller 2214 may be effectively avoided, and the service life of the primary roller 2213 and the secondary roller 2214 may be lengthened. In addition, since the secondary roller 2214 is not affected by the gravity of the slider 220, the secondary roller 2214 may always be kept tangent to the secondary contact surface 212 when rolling, thereby ensuring the sliding accuracy of the slider 220 in the second direction.

In some embodiments, for the group of secondary rollers 2216 and the group of primary rollers 2215 on one side of the guiding rail 210, the highest point of the secondary roller 2214 may be higher than the upper end surface of the primary roller 2213, and the lowest point of the secondary roller 2214 may be lower than the lower end surface of the primary roller 2213. Accordingly, when the highest point of the secondary roller 2214 is higher than the upper end surface of the primary roller 2213, the upper end surface of the primary roller 2213 may not contact the inner top surface (e.g., the inner top surface 232 in FIG. 6) of the sliding groove 230. When the lowest point of the secondary roller 2214 is lower than the lower end surface of the primary roller 2213, the lower end surface of the primary roller 2213 may not contact the inner bottom surface (e.g., the inner bottom surface 231 in FIG. 6) of the sliding groove 230. Since the primary roller 2213 may not generate friction with the secondary contact surface 212 of the guiding rail 210 when rolling with respect to the guiding rail 210, the smoothness of the slider 220 may be effectively improved.

In some embodiments, when the count of secondary rollers 2214 in the group of secondary rollers 2216 is one, the highest point of the secondary roller 2214 may be higher than the upper end surface of the primary roller 2213, and the lowest point may be lower than the lower end surface of the primary roller 2213. In other embodiments, as shown in FIG. 8 and FIG. 9, when there are two secondary rollers 2214 in the secondary roller group 2216, the highest point of the secondary roller 2214 located above may be higher than the upper end surface of the primary roller 2213, and the lowest point of the secondary roller 2214 located below may be lower than the lower end surface of the primary roller 2213.

In some embodiments, as shown in FIG. 8 and FIG. 9, a convex platform 254 may be provided on the bottom surface 253 of the moving platform. The convex platform 254 may include a convex platform end surface 255 and a convex platform side surface 256. The primary roller 2213 may be disposed on the convex platform end surface 255, and the secondary roller 2214 may be disposed on the convex platform side surface 256, to ensure that the top surface and the bottom surface of the primary roller 2213 may not contact the inner top surface 232 and the inner bottom surface 231 of the sliding groove 230.

In some embodiments, as shown in FIGS. 6-9, when the slider 220 matches with the guiding rail 210, the second inner side 252 of each cantilever 251 may be close to two outer side surfaces 214 of the guiding rail 210. The "close" may refer that the second inner surface 252 of the cantilever 251 and the outer side surface 214 of the guiding rail 210 may in contact with each other, or the second inner surface 252 of the cantilever 251 and the outer side surface 214 of the guiding rail 210 may be close to each other but do not contact each other. In some embodiments, the second inner side 252 of the cantilever 251 and the outer side 214 of the guiding rail 210 may not contact each other to prevent the second inner side 252 of the cantilever 251 and the outer side 214 of the guiding rail 210 from generating friction and affecting the smoothness of the slider 220.

FIG. 10 is a sectional view illustrating an exemplary transmission mechanism according to some embodiments of the present disclosure. In some embodiments, as shown in FIG. 10, the shape of the cross-section of the guide rail 210 may be substantially rectangular (or quasi-rectangular), and the guide rail 210 may be a substantially cuboid. Both side surfaces of the guide rail 210 along the first direction may be primary contact surfaces, and the top surface and the bottom surface of the guide rail 210 may be secondary contact surfaces. The slider 220 may further include an outer frame 222 sleeved on the outer side of the guide rail 210. The primary rolling part may include two first rollers 223 located on the inner surfaces of the two sides of the outer frame 222, and the secondary rolling part may include two second rollers 224 located on the inner surfaces of the top and bottom of the outer frame 222. The two first rollers 223 may limit the slider 220 in the first direction of the guide rail 210 (e.g., a direction shown by arrow "W" in FIG. 10). The two second rollers 224 may limit the slider 220 in the second direction (e.g., a direction shown by the arrow "H" in FIG. 10) of the guide rail 210.

Figure 11:
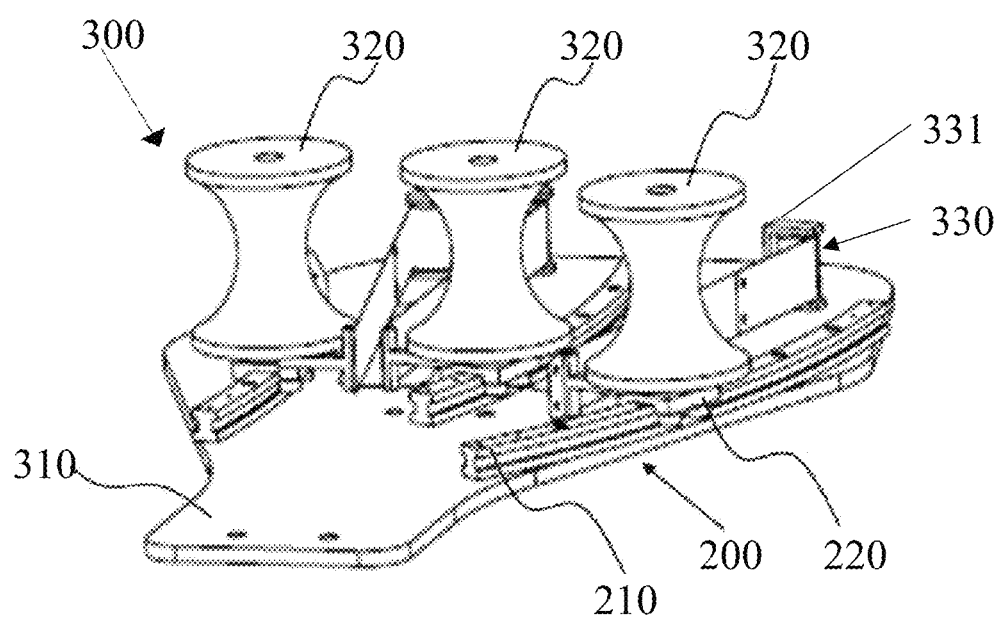
FIG. 11 is a schematic diagram illustrating an exemplary cable management apparatus according to some embodiments of the present disclosure.

FIG. 11 is a schematic diagram illustrating an exemplary cable management apparatus according to some embodiments of the present disclosure. As shown in FIG. 11, a cable management apparatus 300 is provided in the present disclosure. The cable management apparatus 300 may include a bottom plate 310, a wire wheel, and a transmission mechanism 200. The transmission mechanism 200 may be arranged on the bottom plate 310. The wire wheel 320 may be movably arranged on the transmission mechanism 200. The transmission mechanism 200 may be configured to guide a movement of the wire wheel 320. The transmission mechanism 200 in some embodiments may be the same or similar to the transmission mechanism in other embodiments of the present disclosure (e.g., the transmission mechanism 200 in FIGS. 2-10), and may not be described herein.

In some embodiments, a count of wire wheels 320 may be greater than one, and the count of transmission mechanisms 200 may be the same as the count of wire wheels 320. Each transmission mechanism 200 may be separately provided with a wire wheel 320. Merely by way of example, as shown in FIG. 11, the count of wire wheels 320 and the count of transmission mechanisms 200 are both three, and a wire wheel 320 may be arranged on the slider 220 of each transmission mechanism 200. In some embodiments, the wire wheels 320 may be made of a wear-resistant metal material (e.g., 40Cr, 42CrMo, Cr12MoV, etc.), so that the surfaces of the wire wheels 320 may be wear resistance. The service life of the wire wheels 320 may be improved.

In some embodiments, the descriptions of the count of the wire wheels 320 and the transmission mechanism 200 are merely for illustration purpose. Those skilled in the art may also determine the count of the wire wheels 320 and the transmission mechanism 200 as other values, for example, the count of the wire wheels 320 and the transmission mechanism 200 may also be four, five, or more, which may not be described herein.

In some embodiments, a shape of a wire wheel 320 may include, but may not limit to, a shape of a bottleneck, a cylinder, a cone, or the like.

In some embodiments, each wire wheel 320 may move with respect to the bottom plate 310. In some embodiments, each wire wheel 320 may move independently. In some embodiments, the plurality of wire wheels 320 may also move together. In some embodiments, the wire wheel 320 may be guided by the transmission mechanism 200 when moving with respect to the bottom plate 310. In some embodiments, the transmission mechanism 200 may guide a movement of each wire wheel 320 separately. In some embodiments, the transmission mechanism 200 may also guide all the wire wheels 320 at the same time. In some embodiments, through the guidance provided by the transmission mechanism 200, the wire wheels 320 may converge during the movement. The convergence may refer to that a distance between at least two wire wheels 320 may become smaller during the movement. In some embodiments, a portion of the at least two wire wheels 320 may be converged during the movement, and distances of a remaining portion of the at least two wire wheels 320 may remain unchanged during the movement. In some embodiments, all of the at least two wire wheels 320 may be converged with each other during the movement. For example, when the count of wire wheels 320 is three, the distance between two wire wheels 320 of the three wire wheels 320 may remain unchanged during the movement, and distances between another wire wheel 320 and the two wire wheels 320 may gradually decrease during the movement. For another example, when the count of the wire wheels 320 is three, the distance between the two of the three wire wheels 320 may gradually decrease during the movement.

In some embodiments, the transmission mechanism 200 may be arranged on the bottom plate 310 for guiding a movement of the wire wheel. In some embodiments, the transmission mechanism 200 may guide at least two wire wheels 320 to move along a straight line. In some embodiments, the transmission mechanism 200 may also guide at least two wire wheels 320 to move along a curve. The movement path of the wire wheel 320 may be related to a shape of the guide rail 210 of the transmission mechanism 200 in the length direction. In some embodiments, under the guidance of the transmission mechanism 200, movement directions of a portion of the at least two wire wheels 320 may be the same (e.g., a distance between two wire wheels 320 may remain unchanged during the movement). In some embodiments, under the guidance of the transmission mechanism 200, the movement directions of a portion of the at least two wire wheels 320 may be different (e.g., the distance between two wire wheels 320 may become smaller during the movement). For example, the count of wire wheels 320 is three, the movement directions of two wire wheels 320 in the three wire wheels are parallel, and the movement direction of another wire wheel 320 may form a certain angle with the movement direction of the two wire wheels 320. For another example, the count of the wire wheels 320 is three, and the movement directions of the three wire wheels 320 may intersect each other.

In some embodiments, as shown in FIG. 11, the cable management apparatus 300 may further include a reset structure 330 for providing a restoring force to drive the at least two wire wheels 320 from a converged state to a separated state. The converged state may refer to a position state in which at least two wire wheels 320 are close to each other. The separated state may refer to a position state in which at least two wire wheels 320 are away from each other. In some embodiments, the converged state may correspond to a release position (e.g., a position where a cable (e.g., the cable 340 in FIG. 12) on the cable management apparatus 300 is extended on) of the cable management apparatus 300. The separated state may correspond to a take-up position (e.g., a position where the cable on the cable management apparatus 300 contracts in) of the cable management apparatus 300. In some embodiments, the reset structure 340 may be fixedly connected with the bottom plate 310. In some embodiments, the reset structure 340 may also be fixedly connected with the transmission mechanism 200.

In some embodiments, the reset structure 340 may include at least two reset members 331 each of which corresponds to each wire wheel of at least two wire wheels 320. Each reset member 331 may provide a restoring force to drive a corresponding wire wheel 320 from a converged state to a separated state. In some embodiments, the reset member 331 may include a constant force spring, one end of the constant force spring may be fixed to the bottom plate 310 and another end of the constant force spring may be fixed to the wire wheel 320. In some embodiments, when the wire wheel 320 is in the separated state, the constant force spring may be in an undeformed state. When the wire wheel 320 changes from the separated state to the converged state, the constant force spring may be stretched, and the constant force spring may accumulate elastic force. The elastic force may return the wire wheel 320 from the converged state to the separated state. The constant force spring may provide a constant restoring force, thus a process of the wire wheel 320 returning from the converged state to the separated state may be more stable and controllable. In some embodiments, the reset member 331 may also include a coil spring, an air spring, or the like. For example, one end of the coil spring may be fixed to the bottom plate 310, and another end of the coil spring may be fixed to the wire wheel 320. When the wire wheel 320 changes from the separated state to the converged state, the coil spring may deform and accumulate elastic force, and the wire wheel 320 may return from the converged state to the separated state under an action of the elastic force.

In some embodiments, the reset structure 330 may also include a reset member 331. A reset member may simultaneously provide the restoring force to drive all the wire wheels 320 from the converged state to the separated state. For example, one reset member 331 may be an air spring (including an air bag). The air spring may be fixed to the bottom plate 310. All the wire wheels 320 may be fixed on the air bag of the air spring. When the all wire wheels 320 change from the separated state to the converged state, the all wire wheels 320 may compress the air bag to accumulate elastic force.

Figure 12:
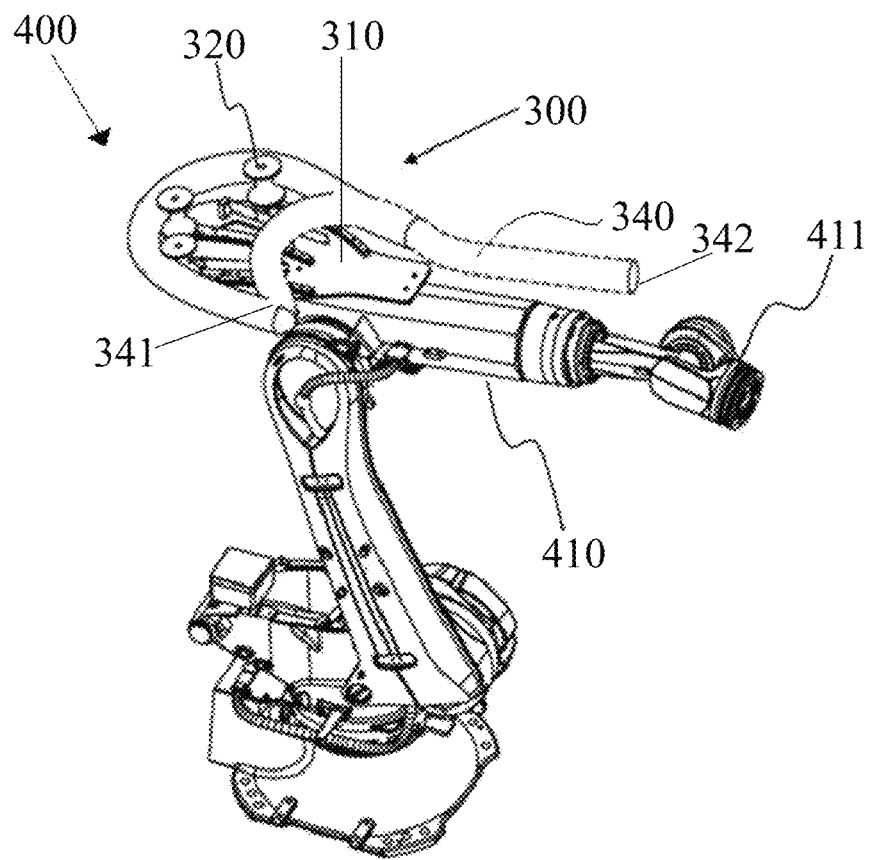
FIG. 12 is a schematic diagram illustrating an exemplary medical device according to some embodiments of the present disclosure.

FIG. 12 is a schematic diagram illustrating an exemplary medical device according to some embodiments of the present disclosure. As shown in FIG. 12, a medical device 400 is provided in the present disclosure. The medical device 400 may include a cable management apparatus 300, a mechanical arm 410, and a C-arm (not shown). The mechanical arm 410 may be fixedly connected with the C-arm through an end 411 of the mechanical arm. The cable management apparatus 300 may include a cable 340, one end of the cable 340 may be fixedly connected with the mechanical arm 410, and another end of the cable 340 may be fixedly connected with the C-arm. The mechanical arm 410 may drive the wire wheel 320 to move through the cable 340. The cable management apparatus 300 in the embodiment may be the same as or similar to the cable management apparatus in other embodiments of the present disclosure (e.g., the cable management apparatus 300 in FIG. 11).

In some embodiments, the bottom plate 310 may be arranged on the medical device 400 to support other components of the cable management apparatus 300. In the embodiment, when the end of the mechanical arm 410 moves, the cable 340 may be stretch, and the cable 340 may drive the wire wheel 320 and the slider 220 to move along the guide rail 210, thereby changing the position of the cable 340 on the bottom plate 310. In addition, when the wire wheel 320 moves, the cable 340 wound on the wire wheel 320 may be released, taken up, or guided in a direction by the cable 340, to prevent the cable 340 from winding, and the mechanical arm 410 may be operated normally.

In some embodiments, the cable 340 may include a fixed end 341 fixed to the mechanical arm 410, and an extension end 342 extending toward the end 411 of the mechanical arm 410 after winding at least two wire wheels 320. The extension end 342 may be fixedly connected with a component on the mechanical arm end 410. The "winding" may refer to that the cable 340 may be arranged around at least two wire wheels 320 and may be connected in contact with each wire wheel 320. In some embodiments, the extension end 342 of the cable 340 may move with the movement of the end 411 of the mechanical arm. In some embodiments, when the extension end 342 of the cable 340 moves in an extension direction, the cable 340 may drive at least two wire wheels 320 to move from the separated state to the converged state to release wires. In some embodiments, when the extension end 342 of the cable 340 moves in the direction opposite to the extension direction, driven by the restoring force of the reset member (e.g., the reset member 331 in FIG. 11), at least two wire wheels 320 may move from the converged state to the separated state, thereby taking up the cable 340 to take up the wires.

The above descriptions are merely the preferred embodiments of the present disclosure, and may not be intended to limit the present disclosure. The modifications, equivalent replacements and improvements made within the spirit and principles of the present disclosure shall be included in the scope of the present disclosure.

What is claimed is:

1. A transmission mechanism, comprising:
a guiding rail; and
a slider movably disposed on the guiding rail, wherein
the slider is provided with a rolling part, the rolling part is configured to roll with respect to the guiding rail, and limit the slider in a first direction and a second direction of the guiding rail;
the first direction and the second direction are both perpendicular to a length direction of the guiding rail, and an angle between the first direction and the second direction is greater than 0° and less than 180°;
the rolling part includes at least two groups of secondary rollers and at least one group of primary rollers on each side of guiding rail along the length direction of the guiding rail;
each group of the at least two groups of secondary rollers includes a plurality of secondary rollers;
at least one side of the guiding rail along the first direction of the guiding rail is provided with a sliding groove;
the plurality of secondary rollers of the each group of the at least two groups of secondary rollers are in contact with different surfaces of the sliding groove respectively, the different surfaces of the sliding groove are oppositely disposed along the second direction and are perpendicular to the second direction; and
the at least one group of primary rollers are arranged between two groups of secondary rollers of the at least two groups of secondary rollers along the length direction of the guiding rail.

2. The transmission mechanism of claim 1, wherein the at least one group of primary rollers includes at least one primary roller; at least one primary roller of the at least one group of primary rollers is in contact with a surface of the sliding groove; an angle between a rolling axis of a primary roller of the at least one group of primary rollers and a rolling axis of a secondary roller of the at least two groups of secondary rollers is greater than 0° and less than 180°.

3. The transmission mechanism of claim 2, wherein a surface of the sliding groove in contact with a primary roller of the at least one group of primary rollers is perpendicular to the first direction of the guide rail, and a surface of the sliding groove in contact with a secondary roller of the at least two groups of secondary rollers is perpendicular to a second direction of the guide rail.

4. The transmission mechanism of claim 2, wherein a group of secondary rollers of the at least two groups of secondary rollers is arranged in front of each of the at least one group of primary rollers and/or behind each of the at least one group of primary rollers along the length direction of the guide rail.

5. The transmission mechanism of claim 2, wherein each of both sides of the guiding rail along the first direction is provided with a sliding groove, each sliding groove of two sliding grooves on both side of the guiding rail has an inner bottom surface, an inner top surface, and an inner side surface;
- a group count of the at least one group of primary rollers is two, and the inner side of each sliding groove is in contact with at least one primary roller of the at least one group of primary rollers;
- both sides of the guide rail along the first direction are respectively provided with two groups of secondary rollers of the at least two groups of secondary rollers, and the plurality of secondary rollers of the each group of secondary rollers are respectively in contact with the inner bottom surface and the inner top surface of the each sliding groove.

6. The transmission mechanism of claim 5, wherein each group of secondary rollers of the two groups of secondary rollers includes two secondary rollers, the two secondary rollers are respectively in contact with the inner bottom surface and the inner top surface of the each sliding groove.

7. The transmission mechanism of claim 1, wherein the guiding rail is arc-shaped.

8. The transmission mechanism of claim 1, wherein the guiding rail includes a plurality of arc segments, and directions of the plurality of arc segments are different.

9. The transmission mechanism of claim 5,
the at least one group of primary rollers includes a first group of primary rollers and a second group of primary rollers, and the first group of primary rollers and the second group of primary rollers are respectively in contact with an inner side surface of the two sliding grooves on the both sides of the guiding rail;
the guiding rail is an arc-shape, and the first group of primary rollers and the second group of primary rollers are respectively located on both sides of the guiding rail along the first direction; and
a first wheelbase is between a plurality of primary rollers of the first group of primary rollers, a second wheelbase is between a plurality of primary rollers of the second group of primary rollers, and the first wheelbase is greater than the second wheelbase.

10. The transmission mechanism of claim 9, wherein an elastic member is arranged between the plurality of primary rollers of the first group of primary rollers, and/or arranged between the plurality of primary rollers of the second group of primary rollers.

11. The transmission mechanism of claim 5, a block is provided on a side of the inner bottom surface and/or inner top surface of the each sliding groove away from the inner side surface of the each sliding groove.

12. The transmission mechanism of claim 2, wherein the each group of primary rollers includes at least two primary rollers, and the at least two primary rollers are arranged adjacent to each other along a length direction of the guiding rail.

13. The transmission mechanism of claim 2, wherein a rolling axis of a primary roller of the at least one group of primary rollers is perpendicular to a rolling axis of a secondary roller of the at least two groups of secondary rollers.

14. The transmission mechanism of claim 3, wherein the slider includes a moving platform and at least one cantilever, the at least one cantilever being arranged on a bottom surface of the moving platform, and extending toward the guiding rail, and each cantilever of the at least one cantilever being provided with a group of secondary rollers.

15. The transmission mechanism of claim 14, wherein both sides of the guiding rail along the first direction are provided with a cantilever, and
the at least one group of primary rollers is arranged on the bottom surface of the moving platform, and the group of secondary rollers is arranged on an inner side of a cantilever towards the guiding rail.

16. The transmission mechanism of claim 15, wherein each group of the at least two groups of secondary rollers includes two secondary rollers, one of the two secondary rollers is located on a side of the cantilever near the moving platform, and the other one of the two secondary rollers is located on a side of the cantilever away from the moving platform.

17. A cable management apparatus, comprising:
a bottom plate;
a wire wheel; and
a transmission mechanism, wherein the transmission mechanism is arranged on the bottom plate, the wire wheel is movably arranged on the transmission mechanism, and the transmission mechanism is configured to provide guidance for a movement of the wire wheel, wherein the transmission mechanism includes:
a guiding rail; and
a slider movably disposed on the guiding rail, wherein the slider is provided with a rolling part, the rolling part rolls with respect to the guiding rail, and limits the slider in a first direction and a second direction of the guiding rail;
the first direction and the second direction are both perpendicular to a length direction of the guiding rail, and an angle between the first direction and the second direction is greater than 0° and less than 180°;
the rolling part includes at least two groups of secondary rollers and at least one group of primary rollers on each side of guiding rail along the length direction of the guiding rail;
each group of the at least two groups of secondary rollers includes a plurality of secondary rollers;
at least one side of the guiding rail along a first direction of the guiding rail is provided with a sliding groove;
the plurality of secondary rollers of the each group of the at least two groups of secondary rollers are in contact with different surfaces of the sliding groove respectively, the different surfaces of the sliding groove are oppositely disposed along the second direction and are perpendicular to the second direction;

a diameter of each secondary roller of the at least two groups of secondary rollers is the same; and the at least one group of primary rollers are arranged between two groups of secondary rollers of the at least two groups of secondary rollers along the length direction of the guiding rail.

18. A medical device, comprising:

a mechanical arm; and a cable management apparatus, wherein the cable management apparatus includes a cable, one end of the cable being fixedly connected with the mechanical arm, wherein the cable management apparatus further includes:

a bottom plate;

a wire wheel; and a transmission mechanism, wherein the transmission mechanism is arranged on the bottom plate, the wire wheel is movably arranged on the transmission mechanism, and the transmission mechanism is configured to provide guidance for a movement of the wire wheel, wherein the transmission mechanism includes:

a guiding rail; and a slider movably disposed on the guiding rail, wherein the slider is provided with a rolling part, the rolling part rolls with respect to the guiding rail, and limits the slider in a first direction and a second direction of the guiding rail;

the first direction and the second direction are both perpendicular to a length direction of the guiding rail, and an angle between the first direction and the second direction is greater than 0° and less than 180°;

the rolling part includes at least two groups of secondary rollers and at least one group of primary rollers on each side of guiding rail along the length direction of the guiding rail;

the at least two groups of secondary rollers includes a plurality of secondary rollers;

each group of at least one side of the guiding rail along a first direction of the guiding rail is provided with a sliding groove;

the plurality of secondary rollers of the each group of the at least two groups of secondary rollers are in contact with different surfaces of the sliding groove respectively, the different surfaces of the sliding groove are oppositely disposed along the second direction and are perpendicular to the second direction;

a diameter of each secondary roller of the at least two groups of secondary rollers is the same; and the at least one group of primary rollers are arranged between two groups of secondary rollers of the at least two groups of secondary rollers along the length direction of the guiding rail.

19. The transmission mechanism of claim 1, wherein the guiding rail is linear.

20. The transmission mechanism of claim 1, wherein a diameter of each primary roller of the at least one group of primary rollers is greater than a diameter of each secondary roller of the at least two groups of secondary rollers.

\* \* \* \* \*